Feb. 11, 1930. V. B. SOUNITZA 1,746,562
DEFLECTION INDICATOR FOR OIL WELLS
Filed July 23, 1927 2 Sheets-Sheet 2
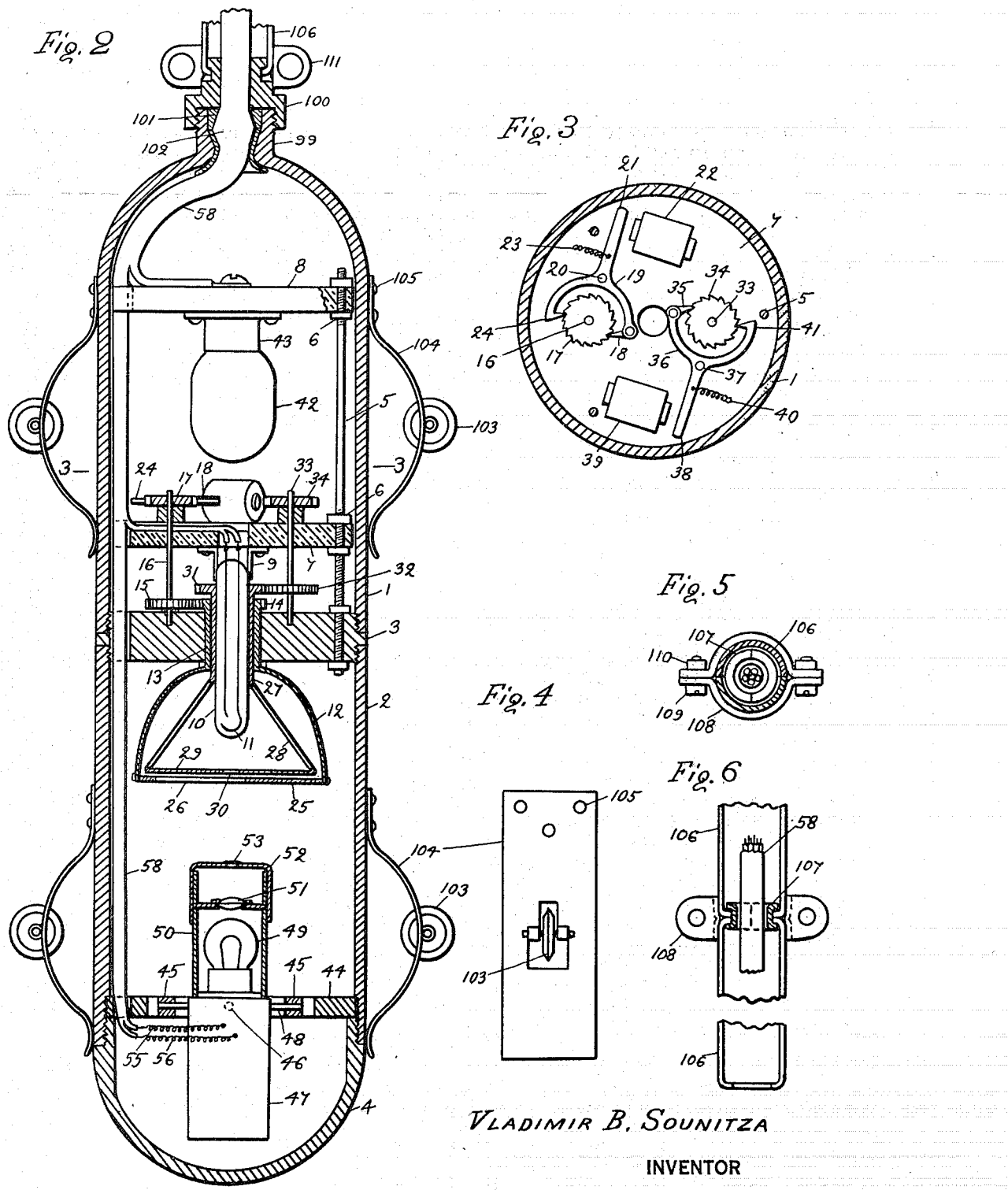
Vladimir B. Sounitza
INVENTOR
BY John P. Nironow
ATTORNEY Patented Feb. 11, 1930

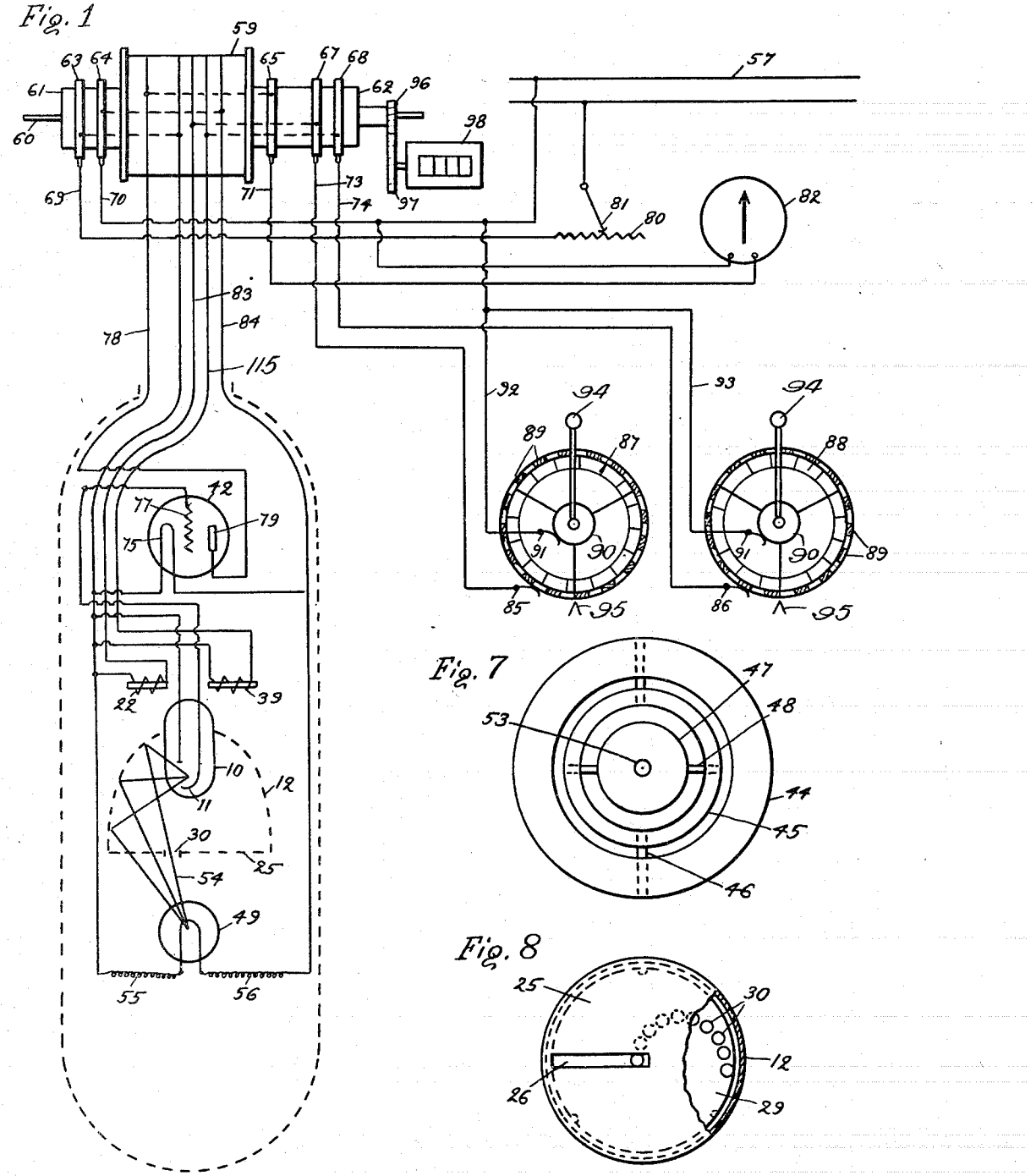

1,746,562

UNITED STATES PATENT OFFICE

VLADIMIR B. SOUNITZA, OF PASADENA, CALIFORNIA

DEFLECTION INDICATOR FOR OIL WELLS

Application filed July 23, 1927. Serial No. 208,023.

My invention relates to deflection indicators for oil wells and has a particular reference to devices adapted to indicate and to measure deflections of an oil well from the vertical line and also its deflections in a horizontal plane.

For this purpose I provide a pendulum adapted to retain its vertical position with all possible inclinations of its supporting frame. A lamp on the pendulum throws a narrow beam of light on a photoelectric element through a deflecting mirror. Different positions of the light beam are determined and measured at a distance by means of an electric synchronous system. Two separate systems are used, one for determining deviations in the vertical, the other—in a horizontal plane.

My invention is more fully described in the accompanying specification and drawings in which—

Fig. 1 is a diagrammatic view of my device together with all the electrical connections, Fig. 2 is a sectional elevation of the measuring tube, Fig. 3 is a plan view of synchronous devices, Fig. 4 is a detailed view of guiding rollers, Fig. 5 is a sectional view of a cable with the enclosing tube, Fig. 6 is a side view of the cable with one half of the enclosing tube removed, Fig. 7 is a plan view of a universal suspension for the pendulum, and Fig. 8 is a bottom view of a composite aperture for the light beam.

My device consists of a tubular container formed of two portions, 1 and 2, joined together by means of a threaded middle block 3. The lower tube 2 is closed at the bottom with a cap 4.

The block 3 supports studs 5 with nuts 6 supporting insulation plates 7 and 8. A socket 9 with a photoelectric element 10 is attached to the plate 7 and extends down through an aperture in the block 2. The sensitive anode 11 of the photoelectric element 10 is placed in the focus of a mirror 12. This mirror is attached to the lower end of a bushing 13 rotatively mounted in the central aperture in the block 3. The upper end of this bushing is provided with a gear 14 in mesh with a pinion 15 mounted on a shaft 16.

This shaft is rotatively mounted in the block 3 and in the plate 7 and has a ratchet wheel 17 on top engaged by a pawl 18 on an arm 19. This arm is pivotally supported on a pivot 20 and has an extension 21 made of a magnetic material and adapted to be attracted by an electromagnet 22. A spring 23 tends to keep the arm away from the magnet, with a tooth 24 engaging the wheel and preventing its accidental displacement.

The lower end of the mirror 12 is covered with a solid diaphragm 25 with a straight slot 26 extending from the center to the periphery of the mirror.

A second bushing 27 is rotatively mounted inside of the first bushing 13 and supports at its lower end rods 28 attached to a thin flat plate 29 placed within a short distance from the plate 25. The plate or diaphragm 29 has a row of apertures 30, located on a curve as shown in Fig. 8.

The tube 27 has a gear 31 on top in mesh with a pinion 32 on a shaft 33 rotatively mounted in the block 3 and plate 7. A ratchet wheel 34 is mounted on the upper end of the shaft 33 and is engaged by a pawl 35 on an arm 36 pivotally supported on a pivot 37. The other end of this arm has an armature 38 adapted to be attracted by a magnet 39. A spring 40 tends to keep the armature away from the magnet, with the retaining tooth 41 engaging the ratchet wheel.

An amplifier vacuum tube 42 is held in a socket 43 attached to the plate 8.

A third plate 44 is clamped between the tube 2 and the cap 4. It has a large central aperture in which a ring 45 is mounted on pivots 46. Inside of this ring a pendulum 47 is supported on pivots 48 located at right angle with the pivots 46.

An electric lamp 49 is supported on the pendulum enclosed in a tube or hood 50 with a magnifying lens 51. A cover 52 fits over the enclosure 50 and is provided with a small central aperture 53 admitting a narrow beam of light 54 on the mirror 12. The current for the lamp may be supplied from dry cells or storage battery in the base of the pendulum or by means of flexible leads 55 and 56 from an outside source (such as an electric line 57, Fig. 1) in a cable 58.

The mirror or reflector 12 is made of a special curvature so that all the rays, passing through the aperture 30 in the slot 26, are reflected in the focus of the reflector where the light sensitive anode 11 is located. The light from the lamp is always reflected as shown, even when the relative position of the lamp is changed due to an inclination of the tubular housing 1 or its deviation from the true vertical position.

The wires leading from the housing are formed in a cable 58 the other end of which is wound on a drum 59 rotatively mounted on a shaft 60. The drum can be rotated by hand or by some suitable power (the rotating attachment is not shown). It has extensions 61 and 62 with collector rings 63, 64, 65, 67 and 68, connected by means of sliding contact brushes with leads 69, 70, 71, 73 and 74. Inside of the drum the ring 63 is connected with a lead 55 connected with one terminal of the lamp, with magnets 22 and 39 and with a filament 75 of the amplifier 42. The ring 64 is connected with the lead 56 completing the circuits for the lamp and for the filament. The ring 65 is connected with a lead 78 from the plate 79 of the amplifier tube 42, connected also with one terminal of the galvanometer 82 by a lead 71. The other terminal of the galvanometer is connected with the power circuit 57 (through the wire 70). The cathode of the photoelectric element 10 is connected with the lead 55, and the anode with the grid 77 of the tube 42. The rings 67 and 68 complete circuits for the magnets 22 and 39. The electric power is supplied from the line 57 through leads 69 and 70 with a regulating resistance 80 and a sliding contact 81. A galvanometer 82 is connected in the circuit with the photoelectric tube and the amplifier and is used for measuring or indicating variations of the electric current through the photoelectric element.

The magnets 22 and 39 are connected by means of wires 83 and 115 with the rings 67 and 68 and wires 73 and 74 which are connected with sliding contacts 85 and 86 of circular commutators 87 and 88. These commutators are provided with a large number of contact segments 89 with insulation spaces between them. All these contact segments are electrically connected together and with contact rings 90. Contact brushes 91 are connected with the power line 57 by means of wires 92 and 93.

The commutators can be rotated by means of handles 94, their positions being indicated by stationary pointers 95, the segments being numbered, or the commutators may be provided with dials (not shown) divided in degrees of a circle.

The drum 59 has a pinion 96 on one end engaging a gear 97 of a revolution counter 98 which may be calibrated in feet of cable 58. The cable is tightly clamped in the conical aperture in the nipple 99 by means of a clamping nut 100 and a cone 101 bearing against an enlarged portion 102 of the cable.

In order to prevent the rotation of the housing or test tube 1 in the well it is provided with sharp wheels 103, rotatively supported on springs 104 attached with one end to the upper and lower portions 1 and 2 of the housing by means of rivets or screws 105. The other end of the spring bears against the surface of the housing on which it can slide. With this arrangement the wheels are tightly pressed against the inner walls of the casing tube of the well, preventing the housing from turning around. The casing pipes usually have certain ridges inside along welding seams which insure the test cylinder from deviating from its position during its progressive movement in the well.

As an additional precaution against any possible rotation of the cylinder the cable is enclosed in a rigid tubular housing as shown in Figs. 5 and 6. This housing consists of tubes 106 which are split longitudinally so that it can be placed on the table while the latter is being unwound from the drum 49. The ends of the tubes are bent inside and are engaged with flared out bushings 107 also split, thereby forming a joint. A split clamp 108 is placed over the joint and tightened with screws 109 and nuts 110. A similar clamp 111 clamps the lower end of the first tube to the nipple 99. The tubes may be made slightly oval to prevent their relative displacements in the clamps 111.

The pipes, while preventing the cylinder from rotation, are sufficiently flexible so as to follow the possible curvatures of the casing pipe in the well.

The operation of my device is as follows.

The drum 49 is placed on top of the well in a position where it can be turned thereby lowering the test cylinder in the casing pipe of the well. The depth or the position of the cylinder is indicated on the index of the revolution counter 98.

The diaphragm 29 is originally set so that the central or first hole 30 is placed in the slot 26 thereby forming but one central aperture in the diaphragm 25. This aperture in this central position will admit the light from the lamp on the anode 11 of the photoelectric element 10 thereby causing a deflection of the galvanometer needle.

This deflection will remain constant as long as the cylinder remains in a strictly vertical position. If the casing, however, deviates from the vertical position at a certain depth, then the test cylinder will also take an inclined position. The pendulum remaining vertical, the light beam will miss the aperture 30, and the galvanometer needle will return to zero.

As soon as this condition is observed, the lowering of the tube is stopped. The handle of the commutator 88 is then moved so as to turn the commutator disc one notch, thereby closing the circuit through the magnet 39 and disconnecting it again. This temporary closing of the circuit will move the ratchet wheel 34 one notch, placing next aperture 30 in line with the slot 26. Considering that the deviations of the casing pipe must take place gradually, the placing of an aperture farther away from the center by one notch will again catch the ray of light, unless the deviation took place in a plane other than the vertical plane passing through the slot 26. If such is the case, that is, the galvanometer does not show any current, then the commutator 87 is turned, thereby rotating the mirror 12 with the slot 26 until the current appears again.

The light beam may become displaced only partially, a small portion of it reaching the aperture, in which case the galvanometer will indicate correspondingly reduced current. The manipulations of the diaphragms by means of the synchronous devices as described must proceed then until the full force of the light beam passes through the aperture.

The number of the contact segments and the ratchet wheel teeth may be made to correspond with the number of the apertures 30, so that for each step of the commutator there will be a complete change of the apertures. Then there will be always present a full sized aperture for the light beam.

In order to obtain this result, also to save the current, a notched wheel may be attached to the commutator (not shown) of any ordinary construction, engaged by a spring, so that the commutator will come to rest only between the active contacts, and the contact springs 85 and 86 will touch insulated spaces where the commutator is not operated.

The pipes 106 are clamped on the cable one at a time while the test tube is being lowered. The upper end of the pipe may be held in some convenient clamp (not shown) of an ordinary construction in order to relieve the cable from the combined weight of the whole string of pipes and, also, to prevent the rotation of the tube with the pipe.

Important advantages of my device are that it is convenient for operation, can be applied to any existing oil well, may be made portable, and can give quickly and accurately the exact curvature of an oil well in horizontal and vertical planes.

I claim as my invention:

1. In a deflection indicator for oil wells, the combination with a pendulum of a housing, means to support said pendulum with a freedom of movement in all vertical planes, a lamp supported on said pendulum, a photoelectric element supported in said housing, a diaphragm between said lamp and said element with an elongated aperture, a second diaphragm with apertures at an angle with the aperture in said first diaphragm, means to direct a narrow beam of light from said lamp on said element through said apertures, means to move said diaphragms with said apertures, means to control and to indicate said movement from the outside of an oil well, means to indicate at the point of observation when said beam of light illuminates said photoelectric element, and means to lower said housing in said oil well.

2. In a deflection indicator for oil wells, the combination with a pendulum, of a housing, means to support said pendulum in said housing with a freedom of movement in all vertical planes, a lamp supported on said pendulum, means to direct a narrow beam of light from said lamp, a photoelectric element supported in said housing, a diaphragm between said lamp and said element with an elongated aperture, a second diaphragm being apertured to form a slot in effect and at an angle with the aperture in said first diaphragm, means to move said diaphragms so as to bring the intersection of said aperture and said apertured slot against said beam of light, means to control said diaphragm moving means from the outside of said well, means to direct said beam of light on said photoelectric element after said beam of light passed through said apertures, means to control and to indicate the movement of said diaphragms from the outside of said well, means to indicate at the point of observation outside of said well when said beam of light illuminates said photoelectric element, and means to lower said housing in said oil well.

3. In a deflection indicator for oil wells, the combination with a pendulum, of a housing, means to support said pendulum in said housing with a freedom of movement in all vertical planes, a lamp supported on said pendulum, a photoelectric element in said housing, a diaphragm between said lamp and said element with an elongated aperture, a second diaphragm being apertured to form a slot in effect and at an angle with the aperture in said first diaphragm, means to direct a narrow beam of light from said lamp on said diaphragms, a mirror adapted to direct said beam of light after it has passed through the intersection of said aperture and said slot, on said photoelectric element, means to control and to indicate the movements of said diaphragms at a distance from said housing, means to indicate when said beam of light illuminates said photoelectric element, and means to lower said housing in said oil well.

4. In a deflection indicator for oil wells, the combination with a pendulum, of a housing, means to support said pendulum in said housing with a freedom of movement in all vertical planes, a lamp supported on said pendulum, a photoelectric element in said housing, a plurality of diaphragms between said lamp and said photoelectric element, said diaphragms being provided with a plurality of apertures forming a single aperture at the point of their intersection, means to direct a narrow beam of light from said lamp on said diaphragms, a mirror adapted to reflect said beam of light on said photoelectric element, means to indicate at the point of observation outside of said well when said photoelectric element is illuminated by said beam of light, means to rotate said diaphragms, said means being controlled from the outside of said well, means to indicate the movements of said diaphragms at the point of observation outside of said well, and means to lower said housing in said well.

5. In a deflection indicator for oil wells, the combination with a pendulum, of a housing, means to support said pendulum in said housing with a freedom of movement in all vertical planes, a lamp supported on said pendulum, a photoelectric element in said housing, a plurality of diaphragms between said lamp and said photoelectric element, said diaphragms being provided with a plurality of apertures forming a single aperture at the point of their intersection, means to rotate said diaphragms, means to electrically control said diaphragm moving means from the outside of said well, means to indicate at a distance the position of said diaphragms, and an electric circuit comprising said photoelectric element, an amplifying vacuum tube and an indicator adapted to indicate at a distance when said beam of light reaches said photoelectric element through said single aperture.

Signed at New York, in the county of New York and State of New York, July A. D. 1927.

VLADIMIR B. SOUNITZA.